United States Patent
Choi et al.

(10) Patent No.: US 7,459,812 B2
(45) Date of Patent: Dec. 2, 2008

(54) SWITCHED RELUCTANCE MOTOR

(75) Inventors: Jay-Ho Choi, Seoul (KR); Jun-Young Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 11/093,308

(22) Filed: Mar. 30, 2005

(65) Prior Publication Data
US 2006/0022542 A1 Feb. 2, 2006

(30) Foreign Application Priority Data
Jul. 27, 2004 (KR) ............... 10-2004-0058736

(51) Int. Cl.
*H02K 1/04* (2006.01)
(52) U.S. Cl. .................. 310/43; 310/89; 310/216
(58) Field of Classification Search .......... 310/50, 310/68 B, 166, 156.39, 181, 254, 216–218, 310/43–45, 89; 318/362, 701, 721
See application file for complete search history.

(56) References Cited

U.S. PATENT DOCUMENTS

| | | | | |
|---|---|---|---|---|
| 3,984,711 A | * | 10/1976 | Kordik | 310/49 R |
| 4,015,154 A | * | 3/1977 | Tanaka et al. | 310/42 |
| 4,935,080 A | * | 6/1990 | Hassell et al. | 156/154 |
| 5,148,070 A | | 9/1992 | Frye et al. | |
| 5,239,218 A | | 8/1993 | Hashimoto et al. | |
| 5,821,661 A | * | 10/1998 | Wissmach et al. | 310/194 |
| 6,411,006 B2 | * | 6/2002 | Suzuki et al. | 310/254 |
| 6,462,443 B2 | * | 10/2002 | Horng | 310/68 B |
| 6,806,666 B2 | * | 10/2004 | Kim et al. | 318/362 |
| 2002/0135252 A1 | * | 9/2002 | Burton | 310/156.12 |
| 2006/0073042 A1 | * | 4/2006 | Stewart et al. | 417/423.12 |

FOREIGN PATENT DOCUMENTS

| | | |
|---|---|---|
| DE | 195 27 981 A1 | 2/1997 |
| DE | 100 57 255 A1 | 5/2002 |
| EP | 1 406 371 A2 | 4/2004 |
| GB | 1 427 417 A | 3/1976 |

\* cited by examiner

*Primary Examiner*—Dang D Le
(74) *Attorney, Agent, or Firm*—Birch, Stewart, Kolasch & Birch, LLP

(57) ABSTRACT

A switched reluctance motor includes: a stator including a cylindrical body, a plurality of salient poles coupled to an inner circumferential surface of the cylindrical body and provided with a winding coil, and an exterior member formed as a cylindrical shape by encompassing an assembly formed by coupling of the cylindrical body, the salient poles and the like; a rotor rotatably inserted inside the exterior member of the stator; a rotary shaft coupled to the rotor; and a phase indication magnet coupled to the rotor or the rotary shaft. Accordingly, an external structure of the motor is simplified, and the number of components and the number of assembling processes are remarkably reduced.

11 Claims, 5 Drawing Sheets

SWITCHED RELUCTANCE MOTOR

BACKGROUND OF THE INVENTION

1. Field of the Invention

The present invention relates to a switched reluctance motor, and more particularly, to a switched reluctance motor capable of simplifying a structure, remarkably reducing the number of assembling processes and protecting a winding coil.

2. Description of the Background Art

A motor is a device for converting an electric energy to a kinetic energy, and such a motor is used as a power source of almost every machine.

In these days, a reluctance motor is used as a power source of household appliances such as a cleaner or the like. The reluctance motor is classified into a synchronous reluctance motor and a switched reluctance motor. The synchronous reluctance motor is driven by sine waves, and the switched reluctance motor is driven by a pulse signal.

FIG. 1 is a perspective view showing one example of a conventional switched reluctance motor, and FIG. 2 is a plan view of a stator of the switched reluctance motor.

As shown, the switched reluctance motor includes: a stator 100 provided with a plurality of salient poles (P) on an inner circumferential surface of a cylindrical body 110, wherein a coil is wound on the salient pole (P); and a rotor 200 provided with protruding pole portions 220 on an outer circumferential surface of a cylindrical lamination body 210, wherein the number of protruding pole portions is the same as that of the salient poles (P). A rotary shaft 300 is pressingly fixed and coupled to the inside of the rotor 200.

As for the salient pole (P) of the stator, insulation materials 130 each having a predetermined area are respectively coupled to both sides of a tooth 120 having a predetermined shape, and a winding coil 140 wound around the tooth 120 is positioned between the insulation materials 130. The salient poles (P) are insertedly fixed to coupling grooves 111 formed at an inner circumferential surface of the cylindrical body 110 of the stator at regular intervals in a circumferential direction, respectively. By inner sides of the plurality of salient poles (P) mounted at the inner circumferential surface of the cylindrical body 110, a receiving space where the rotor 200 is rotatably inserted is formed.

The rotor 200 is formed as a lamination body made in such a manner that a plurality of thin plates are stacked one on top of another, and protruding pole portions 220 are formed at an outer circumferential surface of the lamination body 210 in a longitudinal direction of the lamination body 210, having predetermined widths and heights.

And, a disc-shaped phase indication magnet 230 with a certain thickness is fixedly coupled to the rotary shaft 300. Poles are magnetized at the phase indication magnet 230 in a circumferential direction, and the number of poles corresponds to the number of salient poles (P) of the rotor. A hall sensor 150 for sensing a phase of the phase indication magnet 230 is provided at the stator side 100. And a parking magnet 160 is provided at the stator side 100, wherein the parking magnet 160 holds a position of the rotor 200 when the rotor 200 stops operating, so that the rotor 200 can be positioned at an effective torque generation area of the stator 100 when being initially activated.

The hall sensor 150, a sensor substrate 170 of the hall sensor and the parking magnet 160 are mounted at a holder 400 injection molded into a predetermined shape.

Non-explained reference number 180 is an insulation plate for insulating the substrate.

The related art is disclosed in Korean Patent No. 2002-59927 applied by the present applicant.

The operation of the switched reluctance motor having such a structure will now be described.

First, when power is supplied to a motor, a current flows through the winding coil 140 of the stator, and then reluctance torque is generated between the stator 100 and the rotor 200, thereby rotating the rotor 200. By the rotation of the rotor 200, the rotary shaft 300 coupled to the rotor 200 and the phase indication magnet 230 coupled to the rotary shaft 300 are rotated together.

And as the phase indication magnet 2300 is rotated, the hall sensor senses a phase of the phase indication magnet 230 and controls a current supplied to the winding coil 140 based on the sensed phase, thereby varying a speed of the rotor 200.

And, in case of stopping the rotor 200, the rotor 200 is stopped at an effective torque generation area by the phase indication magnet 230 connected to the rotor 200 and the parking magnet 160. For an initial activation or a reactivation, the rotor 200 is positioned at the effective torque generation area, a relative position with the stator 100.

Meanwhile, to reduce a manufacturing cost and improve productivity when the switched reluctance motor is mounted to household appliances such as a cleaner or the like, simplification of motor structure and reduction of manufacturing cost are essential and important issues to be achieved. Especially, in case that the motor is applied to a cleaner, protecting a motor from fine dust sucked to the cleaner is an important issue to be achieved.

However, the conventional switched reluctance motor has following problems.

The parking magnet 160 for positioning the rotor 200 at an effective torque generation area as a pair with the phase indication magnet 230 coupled to the rotary shaft 300, the hall sensor 150 for sensing a phase of the phase indication magnet 230, and the sensor substrate 170 connected to the hall sensor 150 are mounted at the holder 400. And the holder 400 is mounted at the stator 100. Therefore, the number of assembling processes for assembling each component becomes great, and the structure becomes complicated. Thus, assembling productivity is deteriorated, and it is not proper to be mass-produced. Particularly, when the holder 400 is coupled to the stator 100, such coupling should be made, precisely maintaining an assembly tolerance, which makes processing and assembling difficult.

In addition, because the winding coils 140 are exposed to the outside, when it is applied to a cleaner or the like, fine particles which are not filtered by a filter of the cleaner collide with and are accumulated on the winding coil 140. By the collision and the oxidization of the fine particles, insulation coating of the winding coil 140 is damaged, thereby shortening a life span of a component.

SUMMARY OF THE INVENTION

Therefore, an object of the present invention is to provide a switched reluctance motor capable of remarkably reducing the number of assembling processes by simplifying a structure.

Another object of the present invention is to provide a switched reluctance motor capable of safely protecting a winding coil.

To achieve these and other advantages and in accordance with the purpose of the present invention, as embodied and broadly described herein, there is provided a switched reluctance motor comprising: a stator including a cylindrical body, a plurality of salient poles coupled to an inner circumferential surface of the cylindrical body and provided with a winding coil, and an exterior member formed as a cylindrical shape by encompassing an assembly formed by coupling of the cylindrical body, the salient poles and the like; a rotor rotatably inserted inside the exterior member of the stator; a rotary shaft coupled to the rotor; and a phase indication magnet coupled to the rotor or the rotary shaft.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
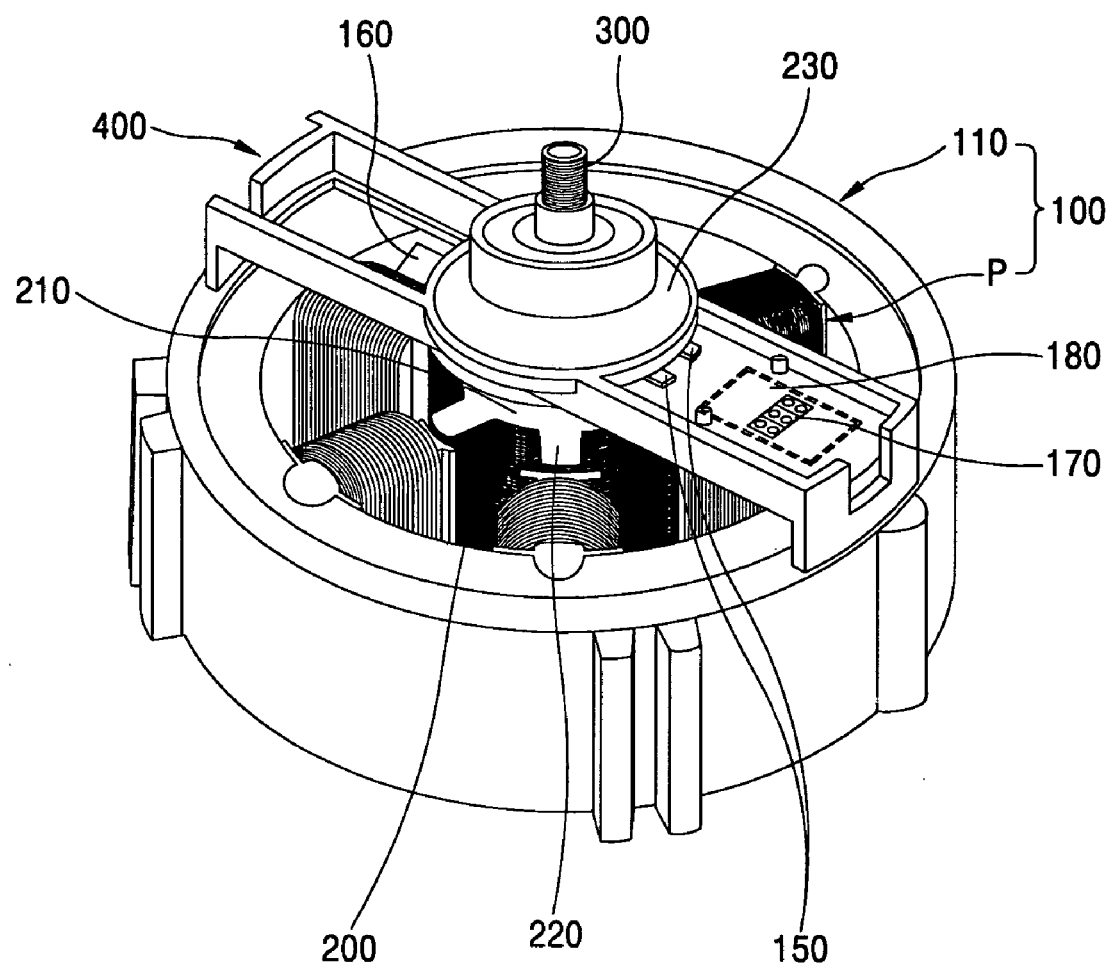
FIG. 1 is a perspective view showing a conventional switched reluctance motor.
Figure 2:
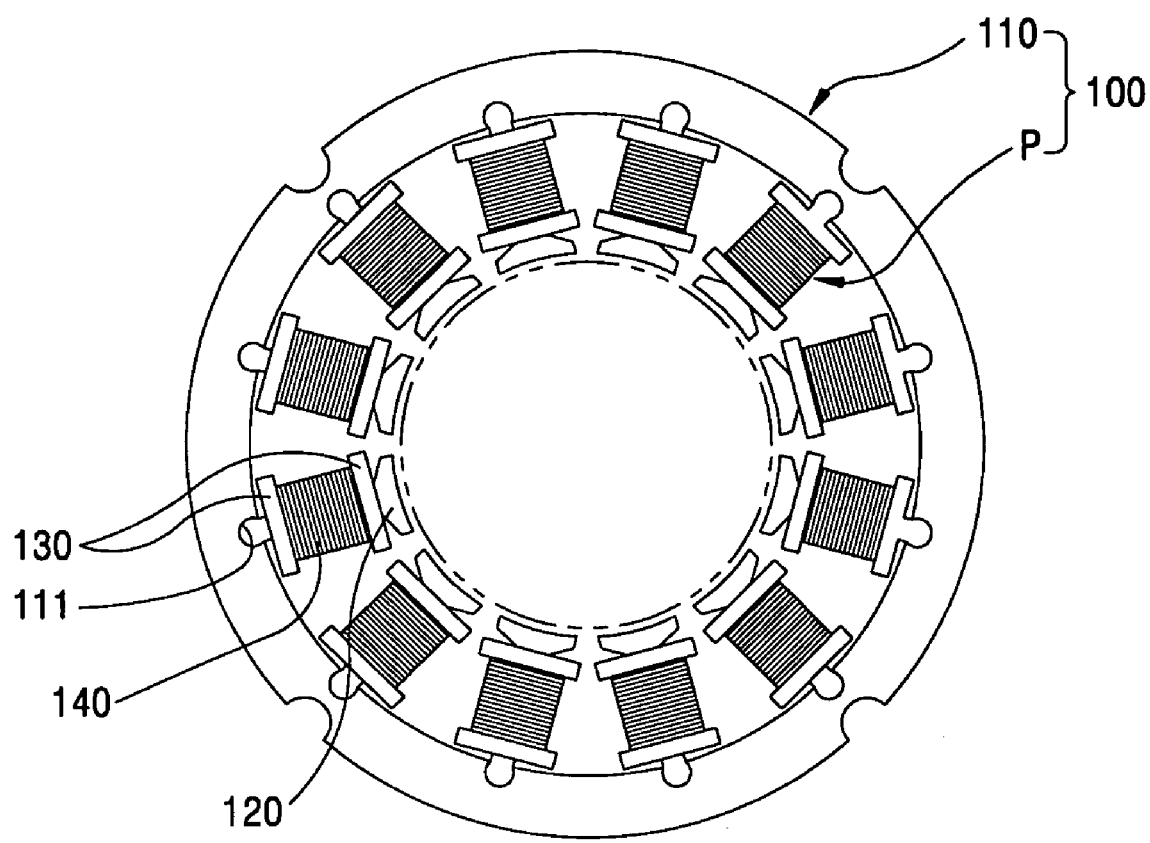
FIG. 2 is a plan view of a stator constituting the switched reluctance motor.
Figure 3:
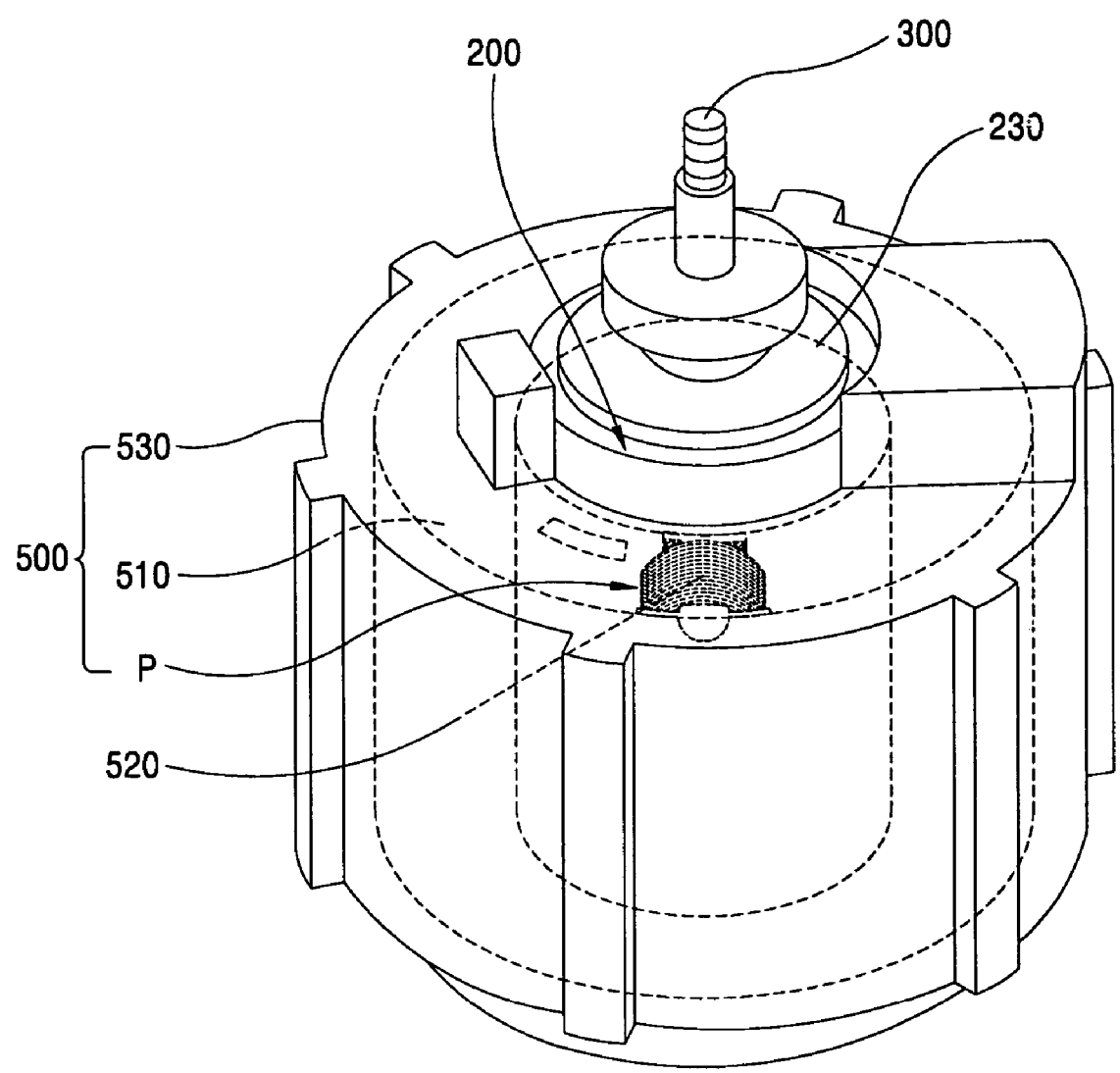
FIG. 3 is a perspective view showing a switched reluctance motor in accordance with the present invention.

FIG. 3 is a perspective view showing one embodiment of a switched reluctance motor in accordance with the present invention. The same reference numbers are given to the same parts as those of the conventional art.

As shown, the switched reluctance motor includes: a stator 500 including a cylindrical body 510, a plurality of salient poles (P) coupled to an inner circumferential surface of the cylindrical body 510 and provided with a winding coil 520, and an exterior member 530 having a cylindrical shape by encompassing an assembly made by the coupling of the cylindrical body 510, the salient poles (P) and the like; a rotor 200 rotatably inserted in the external member 530 of the stator 500; a rotary shaft 300 coupled to the rotor 200; and a phase indication magnet 230 coupled to the rotor 200 or the rotary shaft 300.

As the conventional art, the rotor 200 is made as a lamination body 210 formed in such a manner that a plurality of thin plates are laminated one on top of another, and a plurality of protruding pole portions 220, each having a certain width and height are formed at an outer circumferential surface of the lamination body 210 in a longitudinal direction. The protruding pole portions 220 are formed at regular intervals in a circumferential direction of the lamination body 210.

And the rotary shaft 300 is penetratingly coupled at the middle of the rotor 200, and the phase indication magnet 230 is fixedly coupled to the rotary shaft 300. The phase indication magnet 230 is formed as a disc shape having a certain thickness, and poles are magnetized at the disc in a circumferential direction, wherein the number of poles corresponds to the number of salient poles (P) of the rotor 200.

Figure 4:
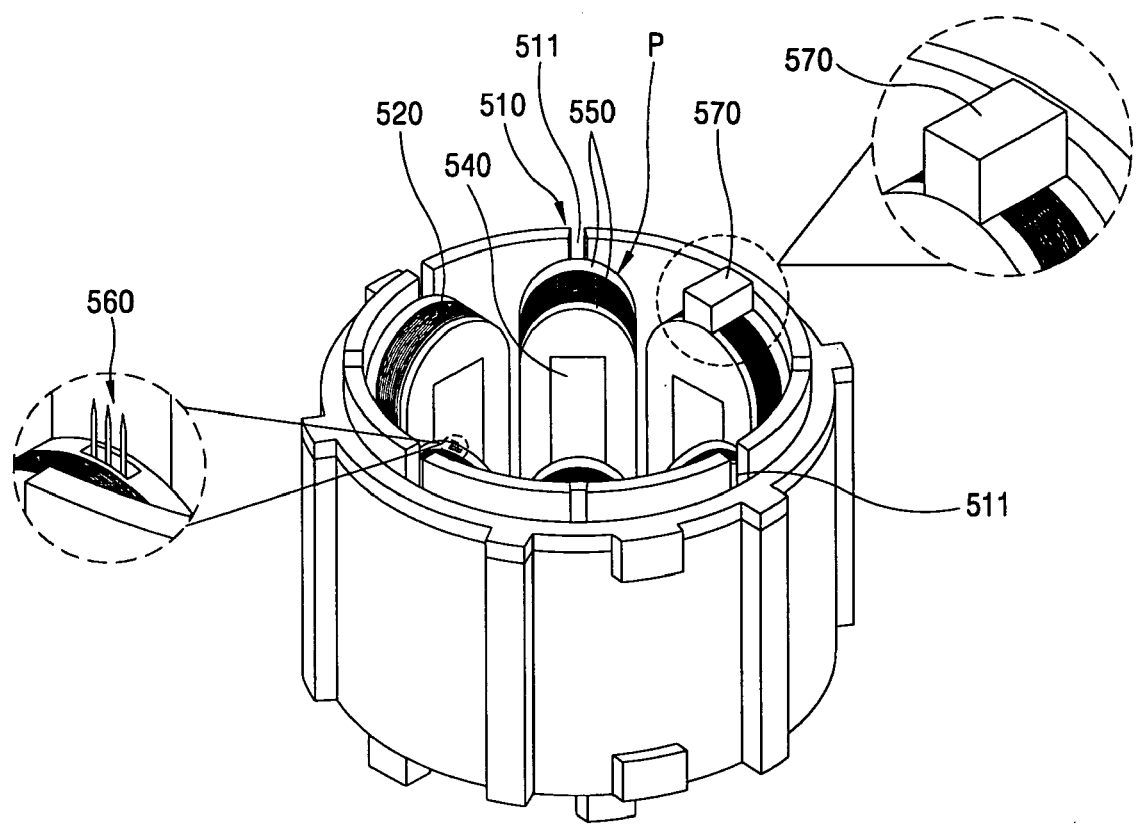
FIG. 4 is a perspective view showing an assembly constituting the switched reluctance motor in accordance with the present invention.

As shown in FIG. 4, the cylindrical body 510 of the stator 500 has predetermined width, outer diameter and length, and a plurality of coupling grooves 511 are formed at an inner circumferential surface of the cylindrical body 510 at regular intervals. The coupling grooves 511 are formed in a longitudinal direction. The cylindrical body 510 may be formed as a lamination body formed by lamination of a plurality of thin plates.

As for the salient pole (P), insulation materials 550, each having a predetermined area are respectively formed at both sides of a tooth 540 having a predetermined shape, and a winding coil 520 wound around the tooth 540 is positioned between the insulation materials 550. The salient poles (P) are insertedly fixed to the coupling grooves 511 formed at an inner circumferential surface of the cylindrical body 510 of the stator 500 at regular intervals in a circumferential direction, respectively.

Figure 5:
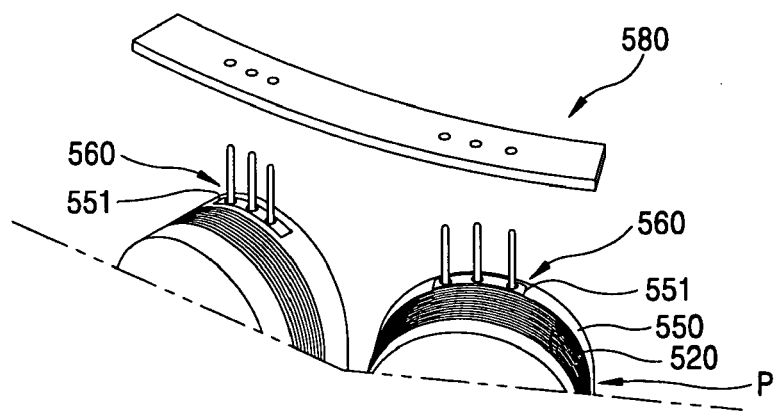
FIG. 5 is an exploded perspective view showing a sensor and a sensor substrate constituting the switched reluctance motor in accordance with the present invention.

Hall sensors 560 for sensing a phase of the phase indication magnet 230 are mounted at one or two (P) of the plurality of salient poles (P) coupled to the cylindrical body 510. And a parking magnet 570 is mounted at a salient pole (P) facing the salient pole (P) provided with the hall sensor 560, wherein the parking magnet 570 holds a position of the rotor 200 when the rotor 200 is stopped, so that the rotor 200 is positioned at an effective torque generation area of the stator 500 when being initially activated. As shown in FIG. 5, the hall sensors 560 are connected to the sensor substrate 580 having a predetermined shape. Preferably, the sensor substrate 580 is formed with both sides curved.

Insertion grooves 551 having a predetermined shape are formed at an upper surface of the insulation material 550 constituting the salient pole (P), and the hall sensors 560 are inserted in the insertion grooves 551, respectively.

The parking magnet 570 is formed as a hexahedron, and is mounted by being adhered to the salient pole (P) with a molding material. The parking magnet 570 may be adhered thereto by an adhesive besides the molding material.

Figure 6:
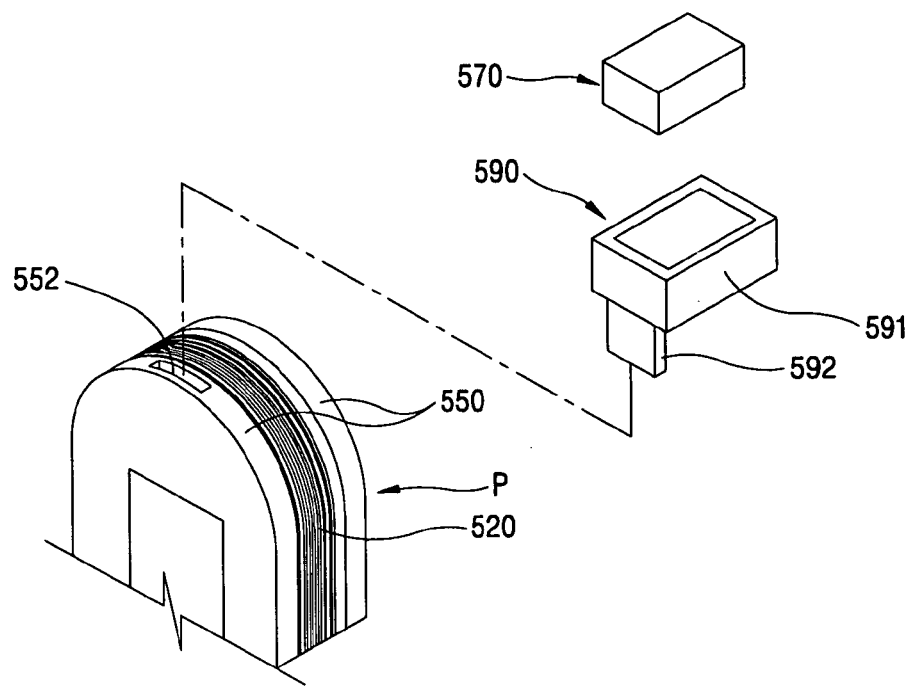
FIG. 6 is an exploded perspective view showing a parking magnet and a retainer constituting the switched reluctance motor in accordance with the present invention.

FIG. 6 shows a modified example of mounting the parking magnet 570 to the salient pole (P). As shown, the parking magnet 570 is inserted in a predetermined-shaped retainer 590, and the retainer 590 is coupled to the salient pole (P). The retainer 590 includes a box portion 591 formed as a quadrangular box shape with its one side opened; and a coupling protruding portion 592 protrudingly formed at a lower surface of the box portion 591 as a predetermined shape. The coupling protruding portion 592 of the retainer 590 is inserted in an insertion groove 552 formed at the salient pole (P).

Figure 7:
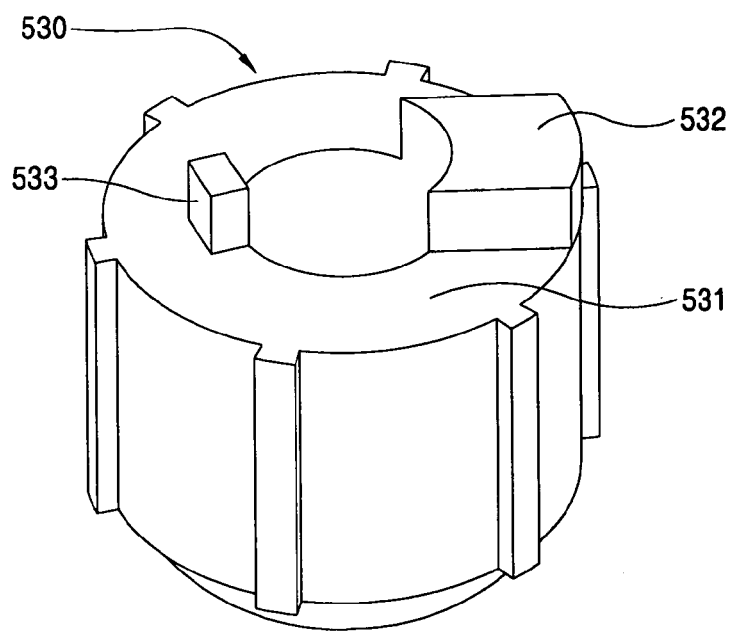
FIG. 7 is a perspective view showing a stator constituting the switched reluctance motor in accordance with the present invention.

As shown in FIG. 7, the exterior member 530 is formed as a cylindrical shape, so as to encompass the cylindrical body 510, the salient poles (P) to be coupled to the cylindrical body 510, the hall sensor 56b mounted to the salient pole (P), the sensor substrate 580 and the parking magnet 570 shown in FIG. 4.

Preferably, the exterior member 530 is made of a molding material, and the molding material is a thermosetting resin. The exterior member 530 is formed by positioning an assembly including the cylindrical body 510, the salient poles (P), the hall sensor 560, the sensor substrate 580 and the parking magnet 570 in a mold having a predetermined shape, then injecting a melted molding material into the mold and solidifying the molding material.

The exterior member 530 includes a cylindrical body portion 531 formed by encompassing the cylindrical body 510 and the salient poles (P) so that the cylindrical body 510 and the salient poles (P) are positioned inside the exterior member 530; a sensor cover portion 532 protrudingly formed at one side of the cylindrical body portion 531 and covering the hall sensors 560 and the sensor substrate 580; and a stopping cover portion 533 protrudingly formed at one side of the cylindrical body portion 531 and covering the parking magnet 570.

The sensor cover portion 532 and the stopping cover portion 533 are positioned to face each other.

The hall sensor 560 and the sensor substrate 580 may be positioned at a variety of positions, and also the parking magnet 570 may be positioned at a variety of positions.

Also, two or more hall sensors 560 may be mounted.

In addition, as another embodiment of the exterior member 530, the shape of the exterior member 530 may be variously implemented.

The operation and effect of the above-described switched reluctance motor will now be described.

First, when power is supplied to the motor and a current flows through the winding coils 520, reluctance torque is generated between the stator 500 and the rotor 200, thereby rotating the rotor 200. As the rotor 200 rotates, the rotary shaft 300 coupled to the rotor 200 and the phase indication magnet 230 coupled to the rotary shaft 300 are rotated together.

And as the phase indication magnet 230 is rotated, the hall sensor 560 senses a phase of the phase indication magnet 230, and controls a current supplied to the winding coil 520 based on the sensed phase, thereby varying a speed of the rotor 200.

In case of stopping the rotor 200, by the interaction between the phase indication magnet 230 connected to the rotor 200 and the parking magnet 570, the rotor 200 is stopped at an effective torque generation area.

The switched reluctance motor is in a state that the exterior member 530 encompasses the cylindrical body 510, the salient poles (P) provided with the winding coil 520, the parking magnet 570, the hall sensors 560, the sensor substrate 580 and the like. Therefore, when the motor is applied to a household appliance such as a cleaner or the like, foreign substances introduced from the outside are prevented from coming in contact with or being accumulated on the winding coil 520, the hall sensor 560, the sensor substrate 580 or the like.

Also, the exterior member 530 is formed by molding after the cylindrical body 510, the salient poles (P), the parking magnet 570, the hall sensor 560, the sensor substrate 580 and the like are assembled. For this reason, an exterior structure is relatively simple, the number of components is decreased; and the number of assembling processes are decreased.

In the conventional structure, the holder 400 is manufactured, the hall sensor 150, the sensor substrate 170, the parking magnet 160 and the like are mounted to the holder 400, and then the holder 400 is mounted to a cylindrical body 110. For this reason, the number of components and the number of assembling processes are relatively great, and assembling operation is complicated because the holder 400 and the cylindrical body 110 should be coupled together, precisely maintaining an assembly tolerance.

In contrast, in the present invention, because the exterior member is manufactured by molding after the cylindrical body 510, the salient poles (P), the parking magnet 570, the hall sensor 560 and the sensor substrate 580 are assembled, manufacturing is simple, and operation for maintaining an assembly tolerance of a relative component is excluded, thereby simplifying the assembling operation.

As so far described, the switched reluctance motor in accordance with the present invention has a simple exterior structure, and is manufactured with a small number of components through a remarkably decreased number of assembling processes, thereby being proper to be mass produced. Also, assembling productivity can be improved, and a manufacturing cost is reduced, thereby improving competitiveness of a product.

In addition, when the switched reluctance motor in accordance with the present invention is applied to household appliances such as a cleaner and the like, fine foreign substances are prevented from colliding with a winding coil and being oxidized, so that a life span of a component is extended thus to improve reliability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A switched reluctance motor comprising:
a stator including:
a cylindrical body,
a plurality of salient poles coupled to an inner circumferential surface of the cylindrical body and provided with a winding coil, and
a cylindrical-shape exterior member encompassing the cylindrical body and the salient poles;
a rotor rotatably inserted inside the exterior member of the stator;
a rotary shaft coupled to the rotor;
a phase indication magnet coupled to the rotor or the rotary shaft;
at least one sensor mounted at one of the salient poles and sensing a phase of the phase indication magnet;
a sensor substrate connected to the sensor; and
a parking magnet mounted at another salient pole facing the salient pole mounted at the sensor, for stopping and positioning the rotor at an effective torque generation area together with the phase indication magnet,
wherein the cylindrical-shape exterior member is formed by molding the cylindrical body, the salient poles, the parking magnet, the sensor and the sensor substrate so as to encompass the cylindrical body, the salient poles, the parking magnet, the sensor and the sensor substrate having been assembled.

2. The motor of claim 1, wherein the exterior member includes a sensor cover portion protruding from the upper surface of the exterior member, for covering the sensor and the sensor substrate.

3. The motor of claim 2, wherein the sensor cover portion is positioned to face the phase indication magnet.

4. The motor of claim 1, wherein the sensor is inserted in an insertion groove formed at the salient pole.

5. The motor of claim 1, wherein the sensor is a plurality of hall sensors.

6. The motor of claim 1, wherein the exterior member includes a stopping cover portion protruding from the upper surface of the exterior member, for covering the parking magnet.

7. The motor of claim 6, wherein the stopping cover portion is positioned to face the phase indication magnet.

8. The motor of claim 1, wherein the parking magnet is adhered to the salient pole by a molding material.

9. The motor of claim 1, wherein the parking magnet is adhered to the salient pole by an adhesive.

10. The motor of claim 1, wherein the parking magnet is inserted in a retainer, and the retainer is coupled to the salient pole.

11. The motor of claim 10, wherein the retainer comprises:
a box portion formed as a quadrangular box shape whose one side is opened; and
a coupling protruding portion protrudingly formed at a lower surface of the box portion as a predetermined shape,
wherein the coupling protruding portion is inserted in an insertion groove formed at the salient pole.

* * * * *